Jan. 23, 1951 R. G. RHOADES 2,539,102
RADIOGRAPHIC INSPECTION APPARATUS
Original Filed June 24, 1946

INVENTOR.
Russell G. Rhoades
BY Naylor and Lavagne
ATTORNEYS

Patented Jan. 23, 1951

2,539,102

UNITED STATES PATENT OFFICE 2,539,102

RADIOGRAPHIC INSPECTION APPARATUS

Russell G. Rhoades, San Francisco, Calif., assignor to Bechtel Brothers McCone Company, a corporation of Delaware Original application June 24, 1946, Serial No. 678,783. Divided and this application December 2, 1946, Serial No. 713,430

1 Claim. (Cl. 248—1)

The present invention relates to the radiographic examination of welds and more particularly to an improved apparatus for radiographing circumferential welds in pipe lines and the like.

The object of the present invention is to provide apparatus facilitating the carrying out of the radiographing method of my Patent No. 2,412,174 issued December 3, 1946 on my prior application Serial Number 678,783 filed June 24, 1946, of which the present application is a division.

The method described and claimed in the above identified application is carried out by making a relatively small temporary opening in the wall of a pipe line adjacent but spaced from a circumferential weld therein, and utilizing said opening to introduce into the interior of the pipe line a source of radiation; so positioning the latter as to insure a clear path for radiation therefrom to the circumferential weld to be radiographed and through said weld to a film held on the exterior of the pipe over the weld. After the necessary exposure time has elapsed, the radiation source is withdrawn and the temporary opening, which is of only sufficient size to freely admit a holder for the radiation source, is permanently sealed.

The apparatus by which the foregoing object is attained will be best understood from the following description of preferred procedure and apparatus, reference being had to the accompanying drawings, forming a part of this specification, in which.

Figure 1:
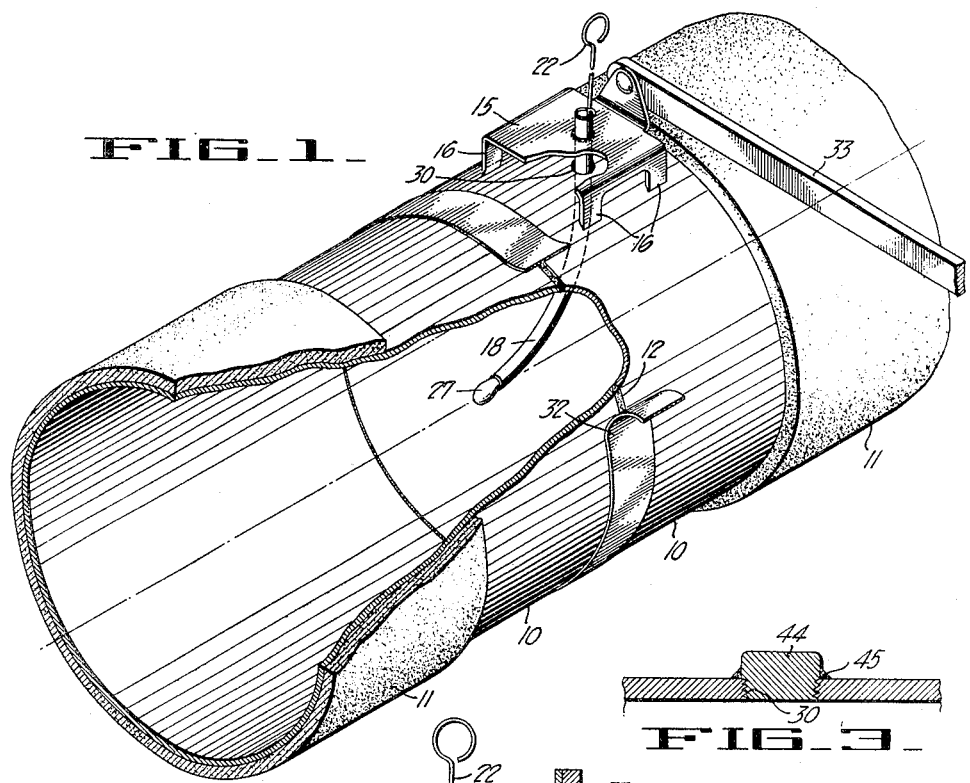
Figure 1 is a perspective view of a preferred form of apparatus embodying the present invention; the same being illustrated in place on a pipe line.

In Figure 1 of the accompanying drawings there is illustrated a portion of a conventional pipe line 10 provided with the usual covering 11 and constructed in sections joined together by circumferential welds such as that illustrated at 12.

According to the method of my invention, a radiograph of any circumferential weld 12 in a pipe line 10, which may extend for many miles, can be made without access to an open end of the pipe line. To facilitate the carrying out of the radiographing method of said invention, there is preferably provided, according to the present invention, apparatus of the character illustrated in Figures 1 and 2 which comprises an orienting device 15 adapted to rest in stable equilibrium on the curved upper surface of a cylindrical object such as a pipe line 10. For this purpose the device 15 is preferably made in the form of a plate having four legs 16 by means of which the device may be firmly and stably supported on the curved surface of a pipe during the period in excess of fifteen minutes required for a complete radiograph exposure.

Figure 2:
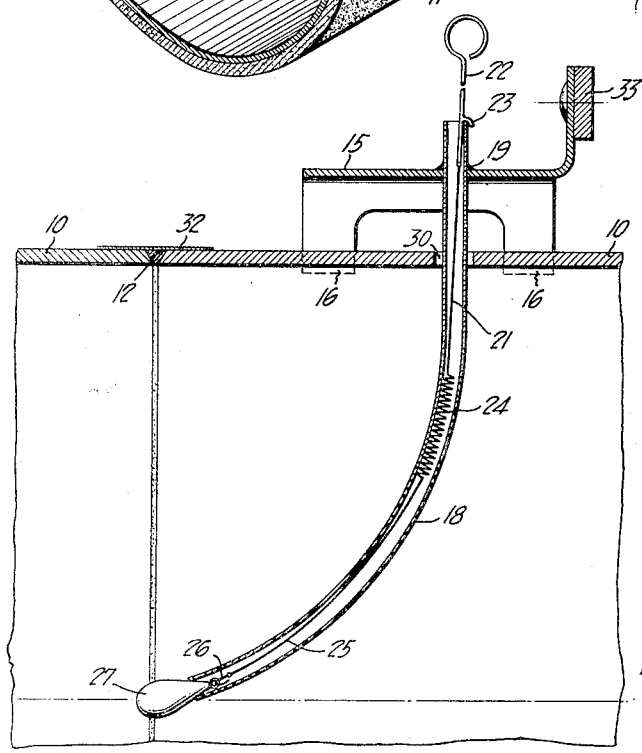
Figure 2 is a detail view of a portion of the apparatus illustrated in Figure 1.

Secured to the orienting device 15 is a carrier 18 preferably in the form of a tube secured to the orienting device 15 by welding as indicated at 19. The tube 18 is curved as indicated in Figures 1 and 2 and proportioned so that its lower end lies outside of the area which the orienting device 15 overlies when it is disposed in the operating position in which it is shown in Figure 1.

When the apparatus is to be used, a radiation emanating means such as a conventional radium capsule is removably supported at the lower end of the tube 18 in any desired manner. A convenient supporting device, the detailed construction of which forms no part of my invention, is illustrated in the accompanying drawing as consisting of a flexible wire 21 the upper end of which is secured to a handle 22 provided with a hooked portion 23 adapted to engage over the upper end of the tube 18. Attached to the lower end of the flexible wire 21 is a spring 24 the lower end of which is in turn connected to a second flexible wire 25 provided with a hook 26 at its lower end. Removably secured to the lower end of the wire 25 by the hook 26 is a conventional radium capsule 27 which is preferably employed as the radiation emanating means in the practice of the present invention, although equivalent devices such as X-ray emanating means are, of course, well known in the art.

The length of the wire and spring assembly 21, 24, 25 is so proportioned to the length of the tube 18 that when the radium pill 27 is engaged in the open lower end of the tube 18 as shown, substantial tension must be applied to the spring 24 in order to engage the hook 23 over the open upper end of the tube 18. This spring tension serves to maintain the radium capsule 27 in position at the lower open end of the tube 18.

In carrying out my improved method utilizing the above described apparatus, which is known in the art as a "jig", a temporary opening such as that illustrated at 30 in Figure 1 of the accompanying drawing is made in the wall of the pipe line at such a distance from the plane of the weld 12 as will bring the radium capsule 27 into the general plane of the weld 12 when the jig is positioned as illustrated in Figure 1 with the tube 18 extending through the temporary opening 30. It is also to be noted that the tube 18 is so positioned with respect to the orienting device 15 that, when the latter is in the stable position illustrated, the radium capsule 27 is substantially on the longitudinal axis of the pipe line. With the device thus positioned, a film 32, which is preferably placed in position before the tube 18 is inserted through the hole 30 and which overlies all of the weld 12 exteriorly of the pipe line 10, will be uniformly exposed and will provide a radiograph of uniform density showing all portions of the weld 12.

Figure 3:
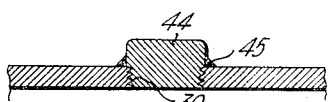
Figure 3 is a detail view illustrating a preferred way of sealing the temporary opening referred to herein.

After the necessary exposure time, determined in a manner well known in the art, has elapsed, the tube 18 is withdrawn from the temporary opening 30 by lifting the orienting device 15 preferably by such means as the hooked handle 33 illustrated in Figure 1, and the temporary opening is permanently sealed by means such as a screw plug 44 (Figure 3) inserted in the opening 30 and welded in place as illustrated at 45.

What is claimed is:

A jig for positioning radiation emanating material in the radiographing of cylindrical pipe joints, comprising means for supporting said jig in stable equilibrium on the upper surface of a cylindrical pipe, a tube secured to said supporting means and having its lower end disposed at a position below said supporting means and beyond the area which said supporting means overlies when resting on a cylindrical pipe, and an extensible spring disposed within said tube and connected to said tube at one end for holding radiation emanating material in position at the lower end of said tube.

RUSSELL G. RHOADES.

REFERENCES CITED

The following references are of record in the file of this patent:

UNITED STATES PATENTS

| Number | Name | Date |
|---|---|---|
| 447,389 | Wentworth | Mar. 3, 1891 |
| 948,872 | Clark | Feb. 8, 1910 |
| 1,306,953 | Fisher | June 17, 1919 |
| 1,808,709 | Blake | June 2, 1931 |
| 2,443,591 | Banks et al. | June 22, 1948 |